United States Patent
Shirley (10) Patent No.: US 11,015,681 B2
(45) Date of Patent: May 25, 2021

(54) ADAPTER FOR MOUNTING A GEAR LIFT BOX

(71) Applicant: Grant Shirley, Poland, OH (US)

(72) Inventor: Grant Shirley, Poland, OH (US)

(*) Notice: Subject to any disclaimer, the term of this patent is extended or adjusted under 35 U.S.C. 154(b) by 0 days.

(21) Appl. No.: 16/594,187

(22) Filed: Oct. 7, 2019

(65) Prior Publication Data

US 2020/0032877 A1 Jan. 30, 2020

Related U.S. Application Data

(62) Division of application No. 15/281,147, filed on Sep. 30, 2016, now Pat. No. 10,527,130.

(51) Int. Cl.
| | |
|---|---|
| *F16H 1/20* | (2006.01) |
| *F16H 57/00* | (2012.01) |
| *F16H 57/031* | (2012.01) |
| *F16H 57/025* | (2012.01) |
| *B60K 17/04* | (2006.01) |
| *F16H 57/12* | (2006.01) |
| *B60B 35/12* | (2006.01) |

(52) U.S. Cl.
CPC ............. *F16H 1/20* (2013.01); *B60K 17/043* (2013.01); *F16H 57/0025* (2013.01); *F16H 57/025* (2013.01); *F16H 57/031* (2013.01); *F16H 57/12* (2013.01); *B60B 35/122* (2013.01)

(58) Field of Classification Search
CPC ...... F16H 1/20; F16H 57/0025; F16H 57/025; F16H 57/031; F16H 57/12; B60K 17/043; B60B 35/122
See application file for complete search history.

(56) References Cited

U.S. PATENT DOCUMENTS

| | | | | |
|---|---|---|---|---|
| 1,355,607 A | * | 10/1920 | Janicki | B60K 17/043 74/390 |
| 7,204,340 B2 | * | 4/2007 | Bordini | B60G 3/12 180/343 |
| 8,640,812 B2 | * | 2/2014 | Bindl | F16H 1/22 180/255 |
| 8,985,264 B2 | | 3/2015 | Shirley | |
| 9,561,715 B2 | * | 2/2017 | Bindl | B60K 17/303 |
| 10,021,831 B2 | * | 7/2018 | Ito | A01D 34/64 |
| 2006/0207384 A1 | * | 9/2006 | Hardy | F16H 57/021 74/640 |
| 2010/0109275 A1 | * | 5/2010 | Sandri | B60G 3/12 280/124.153 |
| 2010/0326226 A1 | * | 12/2010 | Walston | B60K 17/08 74/473.36 |
| 2012/0181850 A1 | * | 7/2012 | Armfield | B60B 35/122 301/132 |
| 2012/0217789 A1 | * | 8/2012 | Yamamoto | B60K 7/0007 301/6.5 |
| 2013/0153321 A1 | * | 6/2013 | Preining | B62M 6/40 180/206.7 |
| 2014/0174230 A1 | * | 6/2014 | Cannata | F16H 57/0441 74/412 R |
| 2014/0230602 A1 | * | 8/2014 | Shirley | B60K 17/354 74/606 R |

(Continued)

*Primary Examiner* — Zakaria Elahmadi
(74) *Attorney, Agent, or Firm* — Pearne & Gordon LLP (57) ABSTRACT

An improved gear lift box with a reduced number of parts through integration of elements and increased durability, serviceability and versatility through reconfiguration of various elements and accessories.

7 Claims, 9 Drawing Sheets

(56) References Cited

U.S. PATENT DOCUMENTS

| | | | |
|---|---|---|---|
| 2015/0231959 A1* | 8/2015 | Ishikawa | B60K 17/043 |
| | | | 301/6.5 |
| 2016/0221432 A1* | 8/2016 | Tamura et al. | B60G 3/12 |
| | | | 180/343 |
| 2017/0074388 A1* | 3/2017 | Cittadino | A47K 10/34 |
| 2017/0097084 A1* | 4/2017 | Eaton | B60K 17/043 |
| 2017/0146108 A1* | 5/2017 | Valente | F16D 13/70 |
| 2017/0320366 A1* | 11/2017 | Milton | B60G 13/10 |
| 2018/0058568 A1* | 3/2018 | Martin | F16H 57/025 |
| 2018/0354298 A1* | 12/2018 | Hays | B60K 7/0007 |
| 2019/0084405 A1* | 3/2019 | Tamura | B60K 17/046 |
| 2019/0232747 A1* | 8/2019 | Tamura | B60K 17/08 |
| 2019/0283561 A1* | 9/2019 | Battaglia | B62D 21/155 |

* cited by examiner

ADAPTER FOR MOUNTING A GEAR LIFT BOX

BACKGROUND OF THE INVENTION

The invention relates to attachments for off road vehicles and, more particularly, to improvements for gear lift box assemblies for such vehicles.

PRIOR ART

ATVs (all-terrain vehicles) and UTVs (utility vehicles), herein both "off road vehicles" or simply "vehicles" are offered by several manufacturers and in different models by some manufacturers. My original U.S. Pat. No. 8,985,264 is directed to novel gear lift units that can be bolted on numerous makes and models of these vehicles to increase ground clearance and make use of larger diameter tires more practical. As with most new technology, there exists a need for improvements. In particular, opportunities exist to improve the universality, simplicity and durability of such units.

SUMMARY OF THE INVENTION

The invention provides a gear lift box assembly for off road vehicles that offers improvements in simplicity, universality and durability, as well as economy of manufacture. Internal gears are provided with integral surfaces spaced in relation to the box or housing internal dimensions to properly engage the inner races of respective pairs of bearings. An integral output gear and spindle reduces manufacturing costs and facilitates disassembly of the gear box if necessary for inspection or repair.

An outer end of the spindle supports a unique wheel hub. The spindle and hub have mating splines and respective abutment shoulders that enable a nut at the outer end of the spindle to maintain these elements in tight abutment throughout extended operation.

The gear lift box assembly, hereafter sometimes referred to simply as the box assembly, includes a wheel hub and brake rotor set that is compatible with various standard factory wheels of major ATV and UTV vehicles as well as commonly used oversized replacement wheels having different bolt circles and bolt diameters. Additionally, the disclosed hub and rotor construction in conjunction with a uniquely located brake caliper bracket is compatible with the brake calipers of present day major off road vehicle manufacturers.

BRIEF DESCRIPTION OF THE PREFERRED EMBODIMENTS

Figures 1, 2:
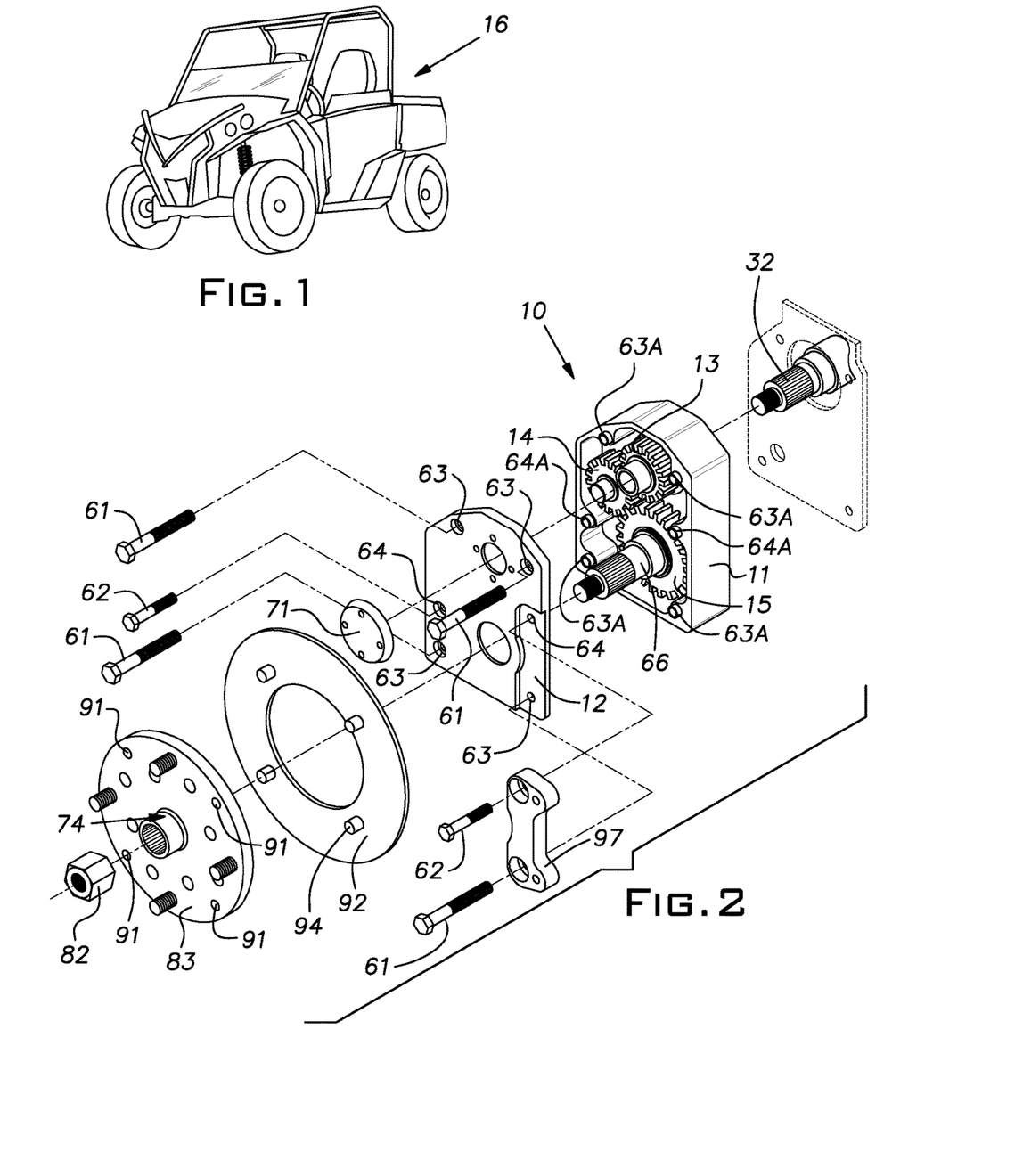
FIG. 1 is a perspective view of an exemplary vehicle employing the invention.
FIG. 2 is an exploded perspective view of the gear lift box assembly of the invention.
Figure 3:
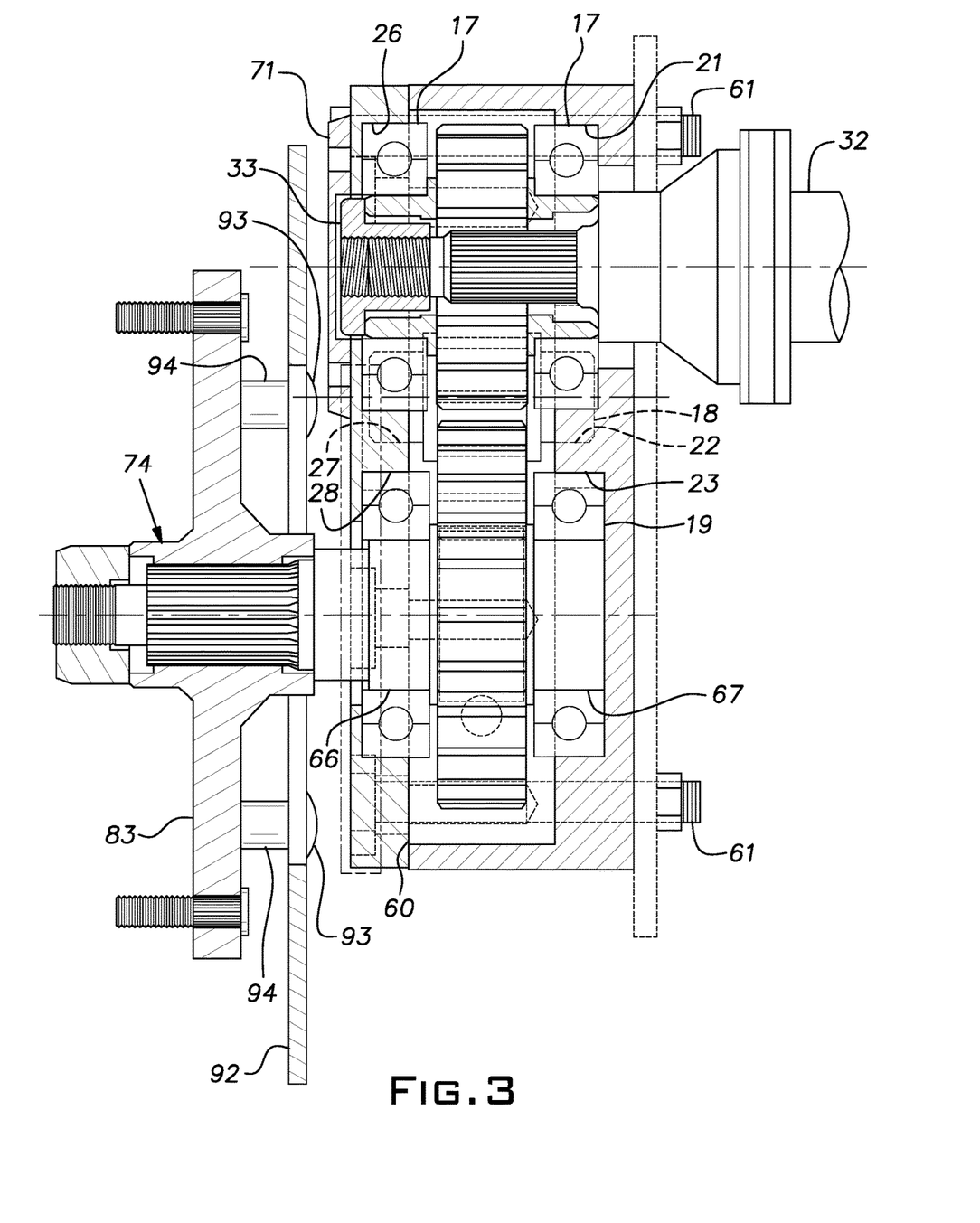
FIG. 3 is a cross-sectional view of the gear lift box assembly.

FIGS. 2-3 illustrate a gear lift box assembly 10 for the left side of a four wheel UTV or ATV such as manufactured by Polaris, CanAm, and Arctic Cat generally illustrated at 15 in FIG. 1. A box assembly for axles at the right side of an off road vehicle is a mirror image of the box assembly 10. An identical box assembly is used for both the front and rear axles of a vehicle 15. In the illustrated example, the box assembly 10 includes an aluminum housing 11 and an aluminum cover plate 12. Both the housing 11 and plate 12 can be machined from aluminum bar or plate stock. A set of three spur gears 13-15 are located in the housing 11, each supported by a pair of associated anti-friction roller bearings 17-19 of automotive quality. Each gear 13-15 has a pair of associated bearings 17-19 received in a respective bore 21-23 in the housing 11 and in a respective bore 26-28 in the cover plate 12. Preferably, the bearings 17-19 are retained in their respective bores 21-23 and 26-28 by a press fit of, for example, about 0.003 inch diametral interference.

Ideally, each of the gears 13-15 and its shaft extensions on both sides are made from a single blank of steel, i.e. each gear is integral with its shaft extensions. The illustrated gears 13-15 are spur gears.

An upper input gear 13 has a central bore with an internal spline proportioned to receive the spline on the axle 32 of the vehicle on which the box assembly 10 is mounted.

Figure 4:
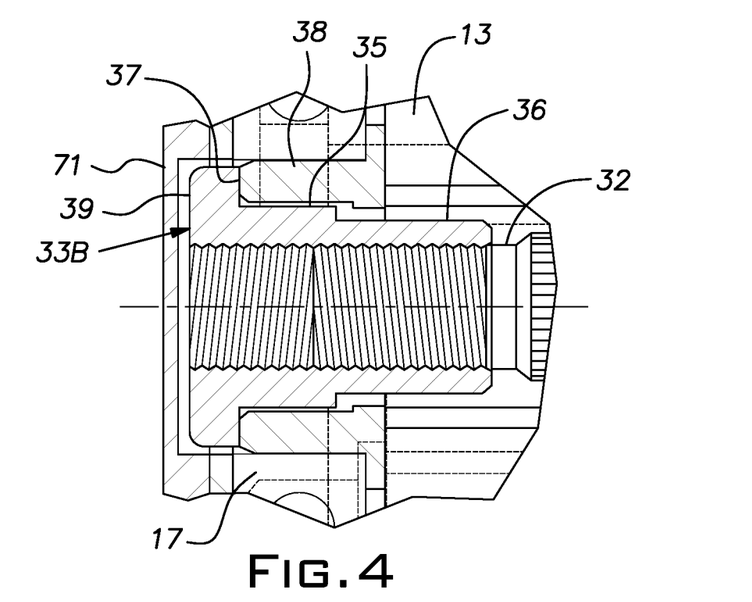
FIG. 4 is a fragmentary cross-sectional view of a first version of an axle retaining nut in the gear lift box assembly.
Figure 5:
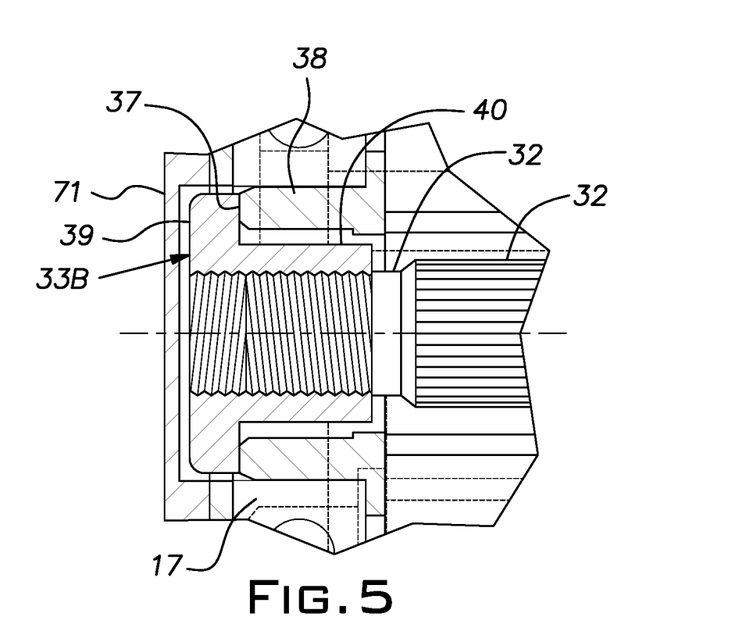
FIG. 5 is a fragmentary cross-sectional view of a second version of an axle retaining nut in the gear lift box assembly.

The axle 32 of a vehicle is retained in the input gear 13 by a special machined nut 33 specific to the particular vehicle with which the box assembly 10 is used. FIGS. 4 and 5 illustrate two versions of an axle retaining nut. The nut 33A of FIG. 4 is used where the vehicle axle 32 is relatively short. The nut 33A has a hexagonal head 34 of limited length and smaller stepped cylindrical extensions 35, 36 substantially longer than the axial length of the head. The length and diameter of the axle from an outer CV joint of a vehicle depends on the vehicle manufacturer. The nut 33A is internally threaded preferably along its full length. As shown, the nut 33A is threaded onto the axle 32 until the head 34 is tightened against a radial face 37 of the hollow stub shaft 38 of the input gear 13. The distal extension 36 is sized to fit within a portion of a splined area of the input gear 13 to enable it to engage an adequate length of the threaded end of the axle 32.

The nut 33B of FIG. 5 can be used when the vehicle axle 32 is relatively long. The nut 33B includes a hexagonal head 39 of limited length and a cylindrical extension 40. Preferably both the head 39 and extension 40 are internally threaded. The extension 40 is sized to fit in a non-splined outer part of the bore of the input gear 13. The nut 33B is threaded onto the vehicle axle 32 until the head 39 abuts the end face 37 of the hollow stub shaft of the input gear 13.

The input gear 13 has integral shoulders on opposite sides with faces 54 machined with a predetermined distance from one another. Stub shafts 38 integral with the spur gear 13 are received in bores of the respective bearings 17 with a slip or push fit. The gear shoulder faces 54 abut the inner races of the bearings 17.

The intermediate or idler gear 14 has opposed integral stub shafts 58 proportioned to provide a push fit in the bores of the bearings 18. Opposed radial shoulder faces 59 on bosses integral with the gear 14 are machined with a predetermined spacing.

The axial distance between the shoulder faces 54 of the input gear 13 and 59 of the idler gear 14 are determined so as to provide a 0.002 or 0.003 inch axial interference with the inner races of their respective opposed bearings 17, 18 when the cover 12 is tightened on the housing 11. The location of the bearing races is determined by the internal dimensions of the housing at the base of the bearing receiving bores 21, 22, the length of the bearings and the thickness of a gasket 60 assembled between the housing 11 and cover plate 12. The gasket 60 is preferably a relatively thin, compression resistant paper product. For example, the paper-based gasket 60 can be 0.015 thick. The cover 12 and housing 11 are drawn together by bolts 61, 62 in aligned holes 63, 63A, 64, 64A. The holes 63A are clearance through holes while the holes 64A are threaded blind holes. Tightening of the cover 12 on the housing with the bolts 61, 62 assures that the inner races of the bearings 17, 18 are frictionally locked to their associated gears 13, 14 and that each inner bearing race rotates with its respective spur gear. This condition is assured by use of the paper gasket 60 of known thickness and limited compressibility.

The output gear 15, spindle shaft 66 and spindle stub shaft 67 are all integral, formed from a single blank of steel stock. The spindle 66 and stub shaft 67 are each proportioned for a press fit of, for example, 0.0005 to 0.001 inch interference into the inner races of the associated bearings 19.

A circular plate 71 is bolted to an outside face of the cover 12 to seal an opening in the cover associated with the machined nut 33. Shaft seals are provided for the axle 32 where it enters a bore in the housing 11 and on the spindle 66 where it exits the cover plate 12.

The press fit of the spindle shaft 66 and spindle stub shaft 67 in their respective bearings 19 is beneficial in providing a stable support for an oversize wheel carried on the spindle shaft with a wheel hub 74. This arrangement, however, can make separation of the cover 12 from the housing 11 for inspection and/or repair difficult. With the cover bolts 61, 62 removed, one method of opening the cover plate 12 involves externally heating the housing area adjacent the bearing 19 with a torch and tapping the housing immediately outside the bearing to cause the bearing to leave the associated bore. This removal technique is augmented by the integration of the output gear 15 and the spindle shaft 66. The combined inertia of both the gear 15 and spindle shaft 66 is available for drawing the bearing 19 out of its bore in the housing 11 when a blow is struck on the exterior of the housing in this area. It will be understood that the other gears 13, 14, owing to the non-interference fit of their stub shafts in their respective bearings 17, 18 present no significant obstacle to removal of the cover plate 12.

Figure 3A:
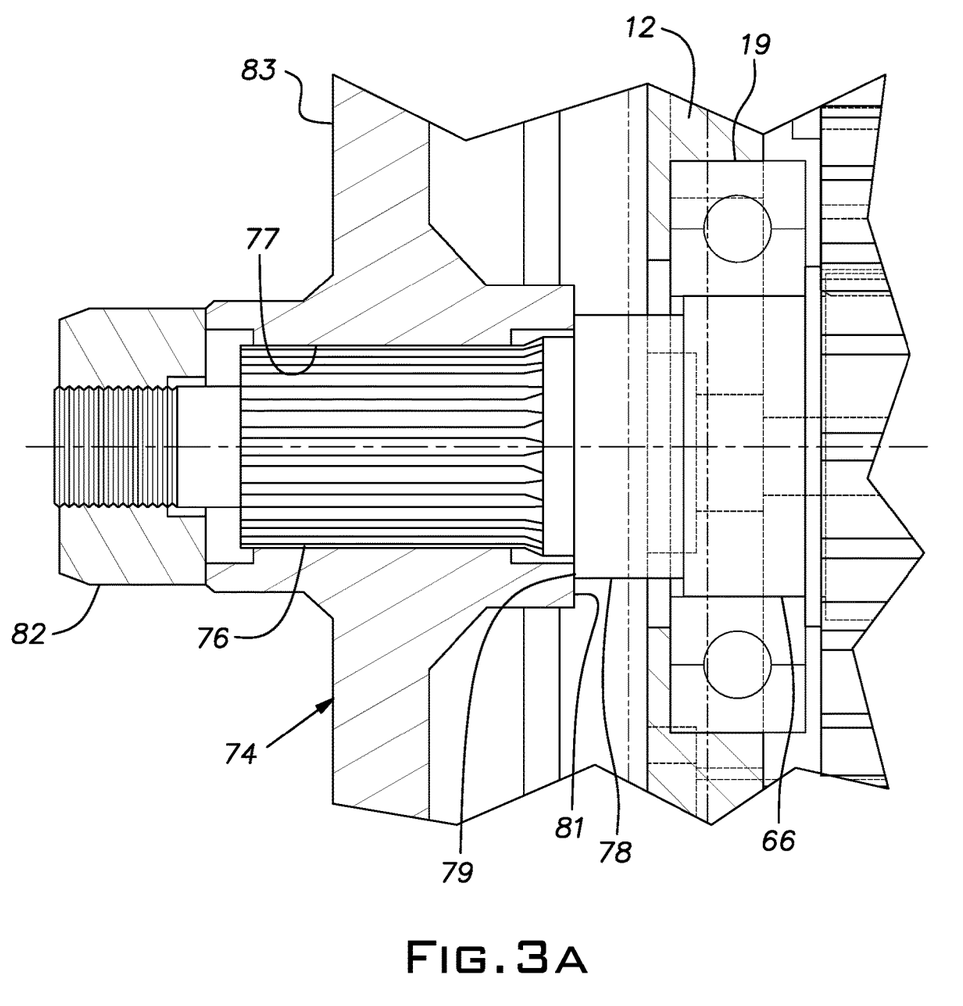
FIG. 3A is a fragmentary cross-sectional view of the wheel hub of the gear lift box assembly.

The spindle shaft 66 has an external spline 76 that mates with an internal spline 77 of the wheel hub 74. The spindle includes a shoulder 78, inward of the spline 76 with a radial face 79. The wheel hub spline 77 terminates within a through bore so that it is spaced from a radial end face 81. The spindle shaft 66 and hub 74 are proportioned so that when the spindle and hub surfaces 79, 81 abut, the end of the hub spline teeth are spaced from the ends of the spindle spline teeth. This relationship allows the hub 74 to be tightened on the spindle 66 with a nut 82 threaded on the end of the spindle without the spline teeth axially interfering with one another. Interference of the spline teeth otherwise could allow compression and wear to occur with the result that the nut 82 could loosen during operation of the vehicle.

The wheel hub 74 includes a radially extending disc 83 with several hole patterns concentric with its center. Three of the sets of drilled holes are provided for receiving wheel lug studs or bolts. It has been discovered that the majority of the vehicles produced by various manufacturers and the most common after-market and oversized wheels can be accommodated with three bolt circles each of a four-hole pattern and all holes dimensioned for a 12 mm diameter stud. The four-hole patterns are on 115 mm, 137 mm and 156 mm circles. This compatibility is achieved even though some manufacturers use a smaller stud diameter on their factory wheels. For economy of manufacturer, the hub is produced with all twelve stud holes but with assembly of only four studs pressed into one set of the four holes selected on the basis of a make and model referenced by a customer.

A set of four holes 91, separate from the wheel stud holes are provided in the hub disc 83 on a circular pattern concentric with the spindle center. A brake rotor 92 is fixed in axially spaced relation from the hub disc 83 with bolts 93 assembled through the rotor and tubular spacers 94 and threaded into the hub holes 91.

A brake caliper assembly originally supplied with the vehicle is installed on the box assembly 10 with a bracket 97 that typically will be unique to such vehicle. The length of the spacers 94 is arranged so that the rotor 92 is conformable to the largest factory caliper of a vehicle for which the box assembly 10 is marketed. It has been discovered that essentially all smaller calipers can be supported on a caliper bracket design for a particular vehicle in a working position relative to a standard position of the brake rotor 92.

In the illustrated embodiment, a caliper bracket 97 is located by holes that index on tubular bosses 98 projecting from a face of the housing 11 closed by the cover plate 12. The tubular bosses lead to the internally threaded holes 64A for reception of the bolts 62. Heads of these bolts 62 serve to clamp the caliper bracket 97 in place and the cover plate 12 tight against the gasket 61. The bracket 97 includes a pair of holes 101 used with bolts to secure the caliper to the bracket.

The box assemblies 10 can be bolted on the control rods or suspension links of a specific vehicle using a suitable adapter plate as is known from my aforementioned U.S. Pat. No. 8,985,264.

Figure 6:
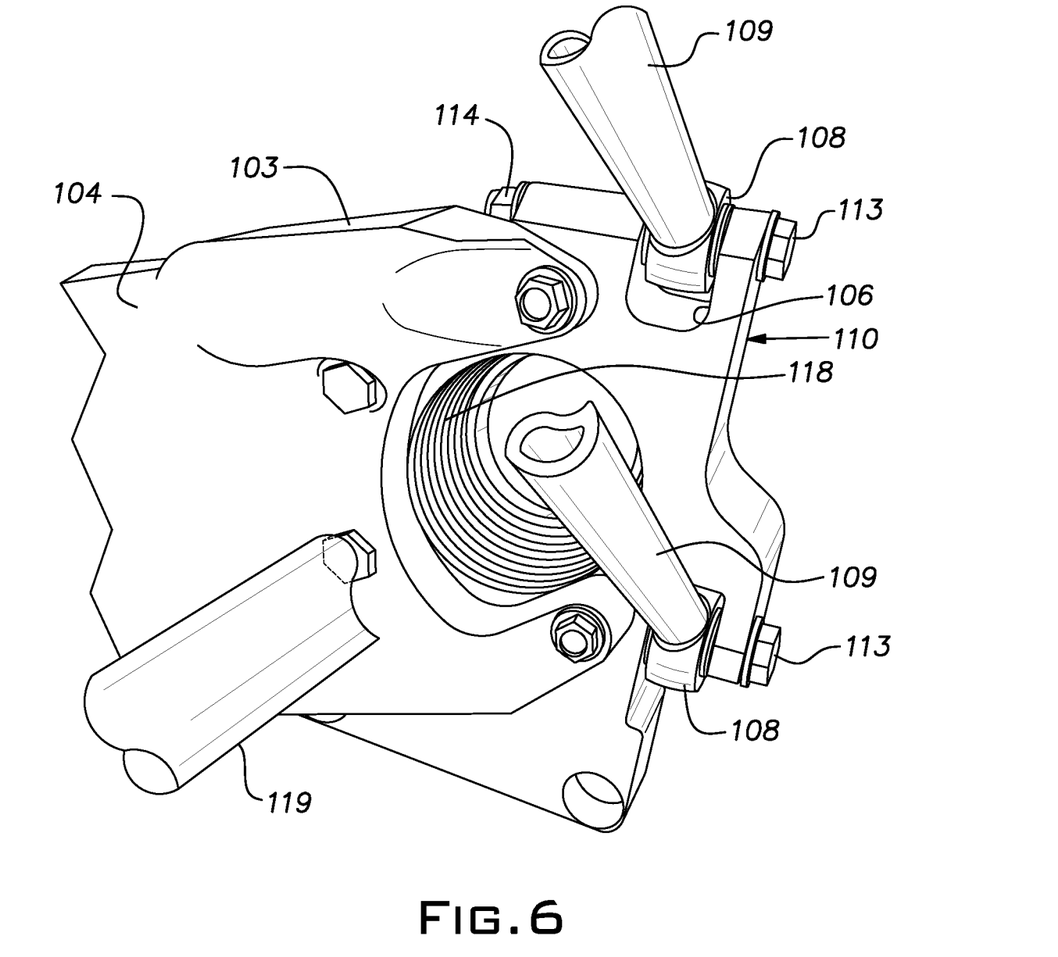
FIG. 6 is a perspective fragmentary view of a first adapter plate for the gear lift box assembly attached to a trailing arm.
Figure 7:
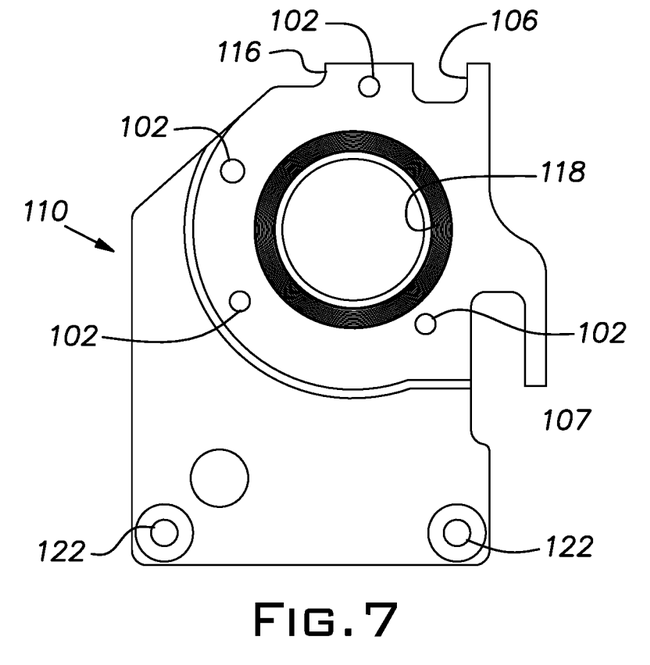
FIG. 7 is an inside elevational view of the first adapter plate.
Figure 8:
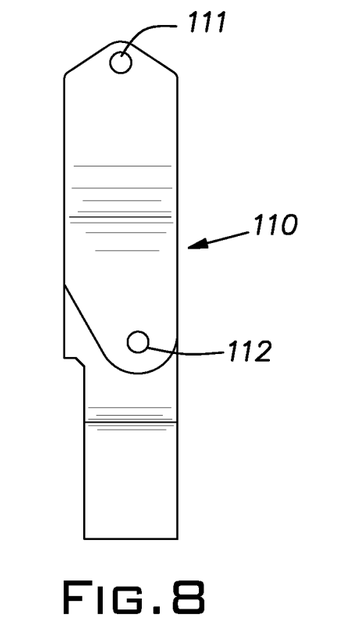
FIG. 8 is a side view of the trailing edge of the first adapter plate.
Figure 9:
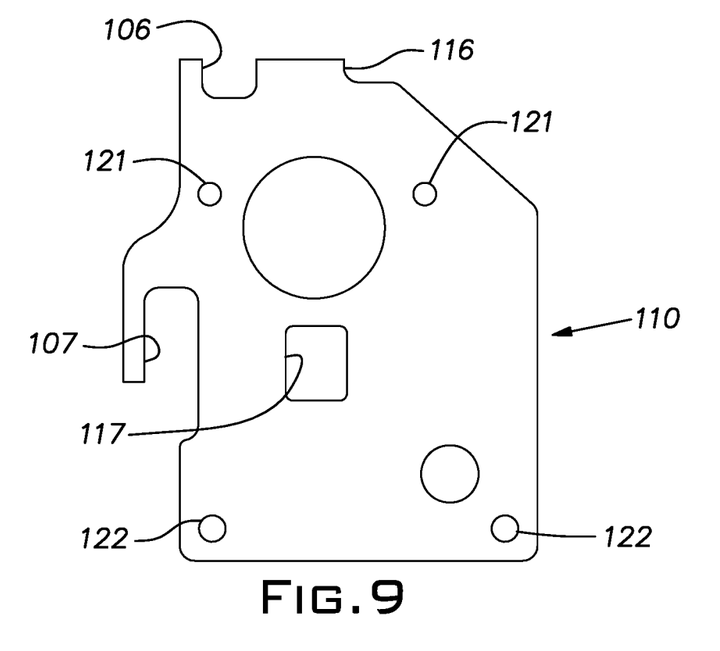
FIG. 9 is an outside elevational view of the first adapter plate.
Figure 10:
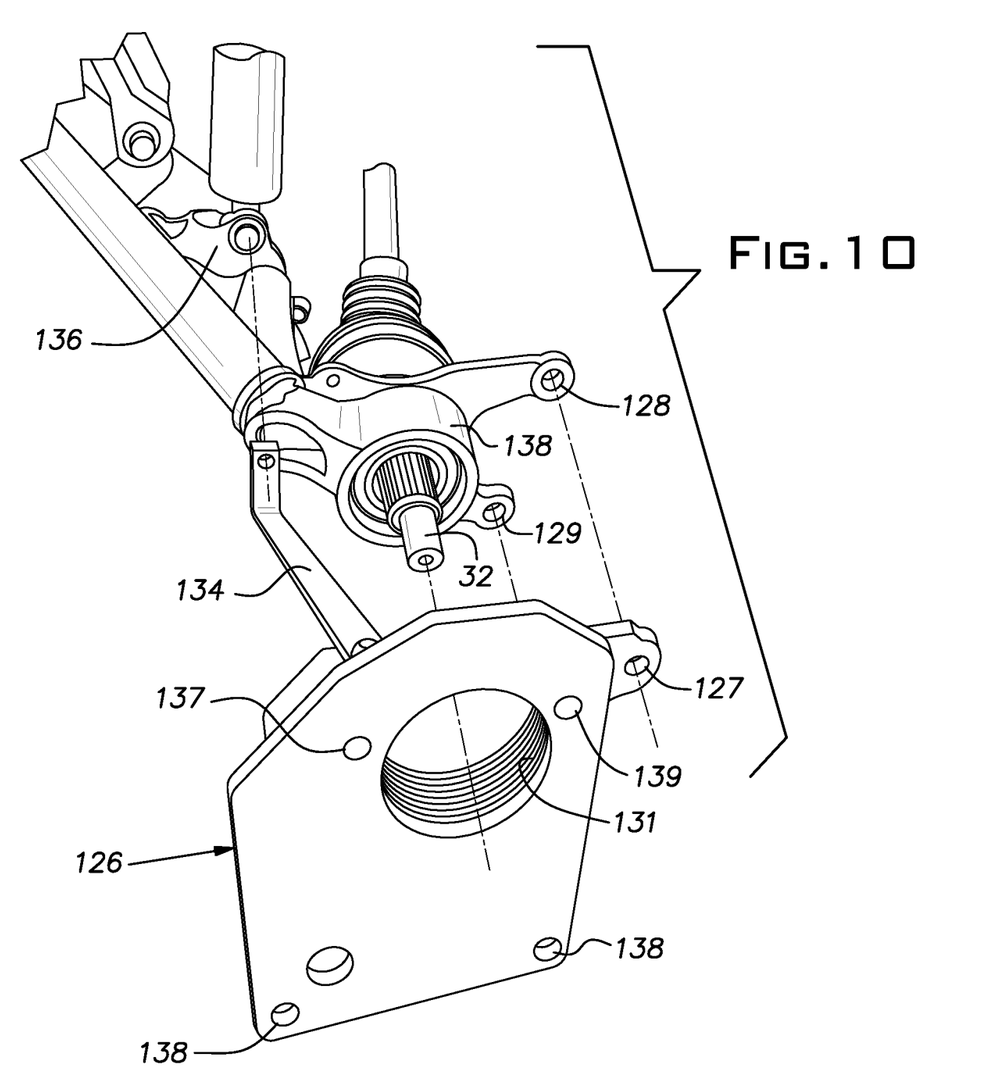
FIG. 10 is an exploded perspective view of a second adapter plate for the gear lift box assembly.
Figure 11:
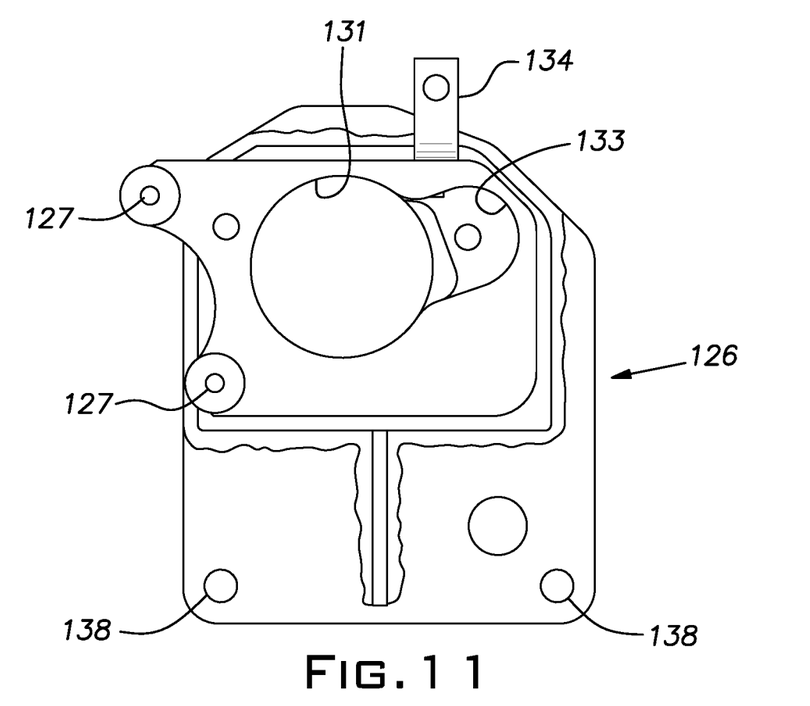
FIG. 11 is an inside elevational view of the second adapter plate.
Figure 12:
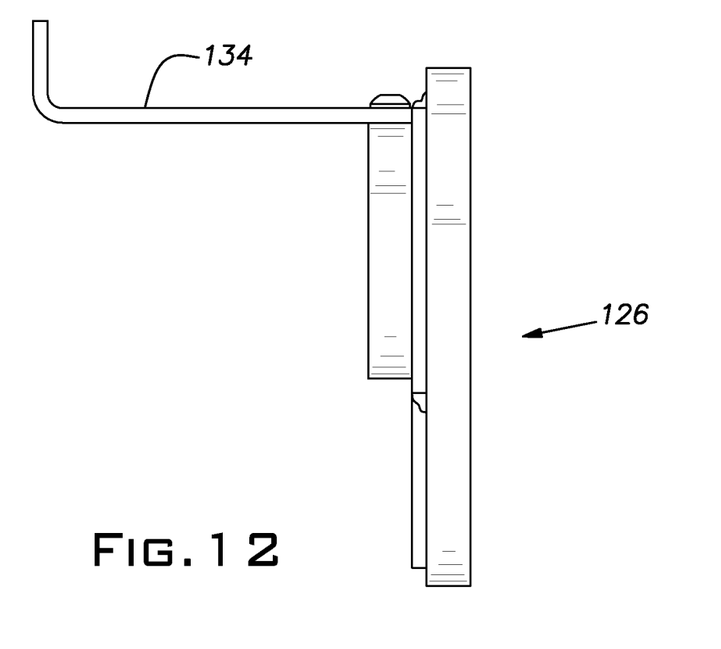
FIG. 12 is a side view of the leading edge of the second adapter plate.
Figure 13:
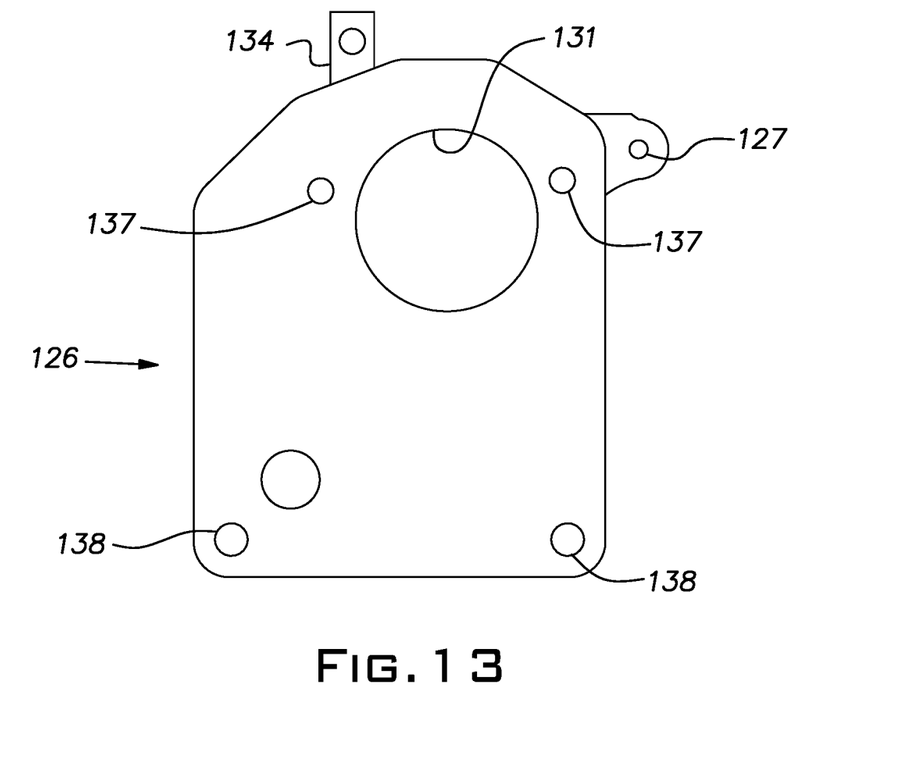
FIG. 13 is an outside elevational view of the second adapter plate.

FIGS. 6 and 10 illustrate the adaptability of the gear lift box 10 for mounting on a variety of vehicle axle and suspension designs. In FIG. 6 an adapter plate 101 is substituted for an original bearing housing, in this instance on a Polaris RZR vehicle. The plate, preferably made of aluminum, is machined with the configuration illustrated in FIGS. 7-9. The illustrated adapter plate 101 is for a right hand rear side of the vehicle and the plate for the left rear is a mirror image. Four tapped holes 102 (FIG. 7) accept bolts through aligned holes in an original factory casting 103 on the vehicle trailing arm 104 for mounting the plate 101 to the trailing arm. Slots 106, 107 provide zones that accept ends 108 of factory radius rods 109. Holes 111, 112, transverse to the slots 106, 107 receive bolts 113 that are assembled through the radius rod ends 108. The bolts are retained by nuts 114 at forward ends 116, 117 of the holes 111, 112. A central conical hole 118 in the plate 101 receives the rear axle 119 for installation in a gear lift box 10.

The gear lift box 10 is bolted to the face of the plate 101 opposite to that shown in FIG. 6. An upper pair of threaded holes 121 and a lower set of counterbored holes 122 receive bolts 61 passing through the gear lift box assembly 10 to attach the assembly to the plate 101. The end of the axle 119 outward of the CV joint is rotationally supported in the bearings 17 of the gear lift box 10 as described above.

With reference to FIGS. 10-13, there is shown an adapter plate 126 for mounting the gear lift box 10 on the left rear axle of a vehicle such as a CanAm Outlander. In this arrangement, the original axle bearing is maintained. The adapter plate, which can be an aluminum weldment, has threaded holes 127 enabling it to be bolted to the factory brake caliper mounts 128, 129.

A large hole 131 allows the plate 126 to be assembled over a factory bearing housing 132. A clearance area 133 adjacent the hole 131 on an inside face of the plate 126 fits over portions of the factory bearing housing 132. A bar 134 bolted between the plate 126 and a factory shock absorber lower mount 136 serves as a stabilizing strut for the plate. Two upper threaded holes 137 and two lower clearance holes 138 align with corresponding holes 63 in the gear lift box 10 to permit the box to be bolted to the plate. When the gear lift box 10 is mounted on the vehicle, the original axle bearing and axle contribute support to the gear lift box through the input gear 13 and associated bearings 17.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. An adapter for mounting a gear lift box on a trailing arm comprising a plate in use having a vertical orientation and having a central through hole for receiving an axle and a first set of holes surrounding the central hole for receiving bolts assembled in alignable holes in the trailing arm for attaching the plate to the trailing arm, the plate having a pair of zones, spaced vertically from one another, for receiving ends of radius rods, horizontal cross holes on the plate for receiving bolts with their longitudinal axii parallel to a plane wherein the plane is parallel to the plate and transversely intersecting the zones, and that secure ends of the radius rods, and a second set of holes distributed about the central hole alignable with mounting holes in a gear lift box for attaching the gear lift box to the plate.

2. An adapter for mounting a gear lift box on a trailing arm comprising a plate in use having a vertical orientation and having a central through hole for receiving an axle and a first set of holes surrounding the central hole for receiving bolts assembled in alignable holes in the trailing arm for attaching the plate to the trailing arm, the plate having a pair of zones, spaced vertically from one another, for receiving ends of radius rods, horizontal cross holes on the plate for receiving bolts with their longitudinal axii parallel to a plane wherein the plane is parallel to the plate and transversely intersecting the zones, and that secure ends of the radius rods, and a second set of holes distributed about the central hole alignable with mounting holes in a gear lift box for attaching the gear lift box to the plate.

3. An adapter for mounting a gear lift box on a trailing arm comprising a plate in use having a vertical orientation and having a central through hole for receiving an axle and a first set of holes surrounding the central hole for receiving bolts assembled in alignable holes in the trailing arm for attaching the plate to the trailing arm, the plate having a pair of zones, spaced vertically from one another, for receiving the ends of radius rods that extend from the plate transversely to a plane of the plate, holes on the plate adjacent the zones for receiving bolts with their longitudinal axii parallel to said plane, and connecting the radius rod ends to the plate, and a second set of holes distributed about the central hole alignable with mounting holes in a gear lift box for attaching the gear lift box to the plate.

4. An adapter as set forth in claim 3, wherein the first set of holes are threaded.

5. An adapter as set forth in claim 3, wherein the plate is aluminum.

6. An adapter as set forth in claim 5, wherein a configuration of the plate is machined.

7. An adapter as set forth in claim 3, wherein the plate is made from a single piece of metal.

\* \* \* \* \*